(12) United States Patent
Iida et al.

(10) Patent No.: US 12,734,952 B2
(45) Date of Patent: Sep. 15, 2026

(54) SECURING AID AND SECURING STRUCTURE FOR ARTICLE TO BE TRANSPORTED

(71) Applicant: FANUC CORPORATION, Yamanashi (JP)

(72) Inventors: Takayuki Iida, Yamanashi (JP); Toshihiko Inoue, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 723 days.

(21) Appl. No.: 17/995,414

(22) PCT Filed: Apr. 14, 2021

(86) PCT No.: PCT/JP2021/015411
§ 371 (c)(1),
(2) Date: Oct. 4, 2022

(87) PCT Pub. No.: WO2021/215321
PCT Pub. Date: Oct. 28, 2021

(65) Prior Publication Data

US 2023/0166649 A1 Jun. 1, 2023

(30) Foreign Application Priority Data

Apr. 21, 2020 (JP) ................................ 2020-075449

(51) Int. Cl.
*B60P 7/08* (2006.01)
*B60P 7/135* (2006.01)

(52) U.S. Cl.
CPC ............. *B60P 7/0823* (2013.01); *B60P 7/135* (2013.01)

(58) Field of Classification Search
CPC ..... B60P 7/0823; B60P 7/0807; B60P 7/0853; B60P 7/0815; B60P 7/135; B60P 7/08;
(Continued)

(56) References Cited

U.S. PATENT DOCUMENTS 5,660,451 A * 8/1997 Glynn ................. E05B 73/0082 70/58
5,775,665 A * 7/1998 Haskin ................ E05B 73/0082 248/922
(Continued)

FOREIGN PATENT DOCUMENTS

CN 1709747 A 12/2005
CN 107472117 A 12/2017
(Continued)

OTHER PUBLICATIONS

International Search Report issued in PCT/JP2021/015411; mailed Jul. 6, 2021.

*Primary Examiner* — Amy R Weisberg
*Assistant Examiner* — Philip C Adams
(74) *Attorney, Agent, or Firm* — Studebaker Brackett PLLC

(57) ABSTRACT

The present invention enables simple securing of an article to be transported without requiring provision of dedicated fixtures to securing surface. A securing aid, according to the present invention, which aids in securing an article to be transported to a securing surface of a transporting means carrying out the transportation, the securing aid comprising: a first fastening structure unit for fastening to the article to be transported; and part to be pressed which is pressed by a lashing member in a state of being pressed against the securing surface by the lashing member, wherein the first fastening structure unit is fastened to the article to be transported by working with a third fastening structure unit disposed below the article to be transported.

14 Claims, 10 Drawing Sheets

(58) Field of Classification Search
CPC ...... B61D 45/001; B61D 45/00; B61D 17/08; B65D 2519/00815; B65D 19/44; B65D 85/68; B65D 19/00; F16M 13/02; F16M 11/04
USPC ........................................................... 410/96
See application file for complete search history.

(56) References Cited

U.S. PATENT DOCUMENTS

| | | | | |
|---|---|---|---|---|
| 2005/0280271 | A1 | 12/2005 | Suzuki et al. | |
| 2006/0245890 | A1* | 11/2006 | Hartman ................ | B65H 49/32 414/607 |
| 2014/0290315 | A1* | 10/2014 | Yang ................... | E05B 73/0082 70/58 |

FOREIGN PATENT DOCUMENTS

| | | | |
|---|---|---|---|
| DE | 10 2008 039554 | A1 | 3/2010 |
| DE | 20 2013 005581 | U1 | 9/2014 |
| DE | 20 2018 005 806 | U1 | 2/2019 |
| DE | 10 2020 123 523 | A1 | 6/2021 |
| JP | 3015079 | U | 8/1995 |
| JP | H11-139474 | A | 5/1999 |
| JP | 2001-080668 | A | 3/2001 |
| JP | 2001-191836 | A | 7/2001 |
| JP | 2002-234538 | A | 8/2002 |
| JP | 2003-341781 | A | 12/2003 |
| JP | 2012-062097 | A | 3/2012 |
| TW | 458910 | B | 10/2001 |

* cited by examiner

SECURING AID AND SECURING STRUCTURE FOR ARTICLE TO BE TRANSPORTED

TECHNICAL FIELD

The present invention relates to a securing aid and a securing structure for an article to be transported.

BACKGROUND ART

When shipped from a manufacturing factory, articulated robots, in a group of two or more, are often transported on a loading platform of a truck. The loading platform of the truck serving as a securing surface has a dedicated fixture attached thereto, to make it possible to collectively secure the two or more articulated robots as articles to be transported. The dedicated fixture is provided with a plurality of bolts in accordance with an interface of a securing base provided to a lower portion of the articulated robot. The articulated robots are independently secured onto the loading platform of the truck, by fastening the securing base onto the dedicated fixture with the bolts.

Patent Document 1 discloses securing an assembly of a plurality of LP insulators as articles to be transported such that the assembly stands on the surface of a loading platform of a pallet, by inserting each of securing members such as wood screws into attachment holes formed in a metal supporting fixture provided at lower portions of the LP insulators.

Patent Document 1: Japanese Unexamined Patent Application, Publication No. H11-139474

DISCLOSURE OF THE INVENTION

Problems to be Solved by the Invention

To secure articulated robots onto a loading platform, it is necessary to attach, to the loading platform in advance, a dedicated fixture adapted to an interface of a securing base of the articulated robots. In addition, to secure the articulated robots, it is necessary to fasten each of the articulated robots to the dedicated fixture with a plurality of bolts. For this reason, loading the articulated robots onto the loading platform involves a task of positioning the articulated robots to the plurality of bolts of the dedicated fixture and fastening the plurality of bolts. Unloading the articulated robots from the loading platform involves a task of loosening the plurality of bolts. In a case of loading the plurality of articulated robots on the loading platform, the abovementioned tasks need to be performed repeatedly as many times as the number of articulated robots, which requires a lot of labor.

Under the circumstances described above, there is a demand for a technique that makes it possible to easily secure an article to be transported to a securing surface, without the need to provide a dedicated fixture on the securing surface.

Means for Solving the Problems

A securing aid according to an aspect of the present disclosure is for aiding securing an article to be transported to a securing surface of a transporting means that transports the article. The securing aid includes: a first fastening structure configured to be fastened to the article to be transported; and a pressed part configured to be pressed by a lashing member in a state of being pressed against the securing surface by the lashing member. The first fastening structure is fastened to the article to be transported by cooperating with a third fastening structure provided in a lower portion of the article to be transported.

A securing structure according to an aspect of the present disclosure is for securing an article to be transported to a securing surface of a transporting means that transports the article. The securing structure includes: a securing aid attachable to the article to be transported; and a lashing member that presses the securing aid against the securing surface. The securing aid includes a first fastening structure configured to be fastened to the article to be transported, and a pressed part configured to be pressed by the lashing member. The article to be transported has, in a lower portion thereof, a second fastening structure configured to be fastened to an installation surface on which the article to be transported is installed, and a third fastening structure configured to cooperate with the first fastening structure to fasten the article to be transported and the securing aid together. In a state where the article to be transported having the securing aid attached thereto is on the securing surface, the lashing member is spanned across the pressed part of the securing aid so as to press the securing aid against the securing surface.

Effects of the Invention

According to at least one aspect, it is possible to provide the securing aid and the securing structure for the article to be transported that make it possible to easily secure the article to be transported to the securing surface, without the need to provide a dedicated fixture on the securing surface.

BRIEF DESCRIPTION OF THE DRAWINGS

FIG. 5 is a side view of a lower portion of the article to be transported having two securing aids according to the present embodiment attached thereto;

PREFERRED MODE FOR CARRYING OUT THE INVENTION

Embodiments of a securing aid and a securing structure for an article to be transported will be described with reference to the drawings. In the present specification, an articulated robot (hereinafter, simply referred to as "robot") will be described as the article to be transported. However, as long as the article to be transported is transportable while being secured to a loading platform of a transporting means such as a truck, the article does not necessarily have to be a robot.

Figure 1:
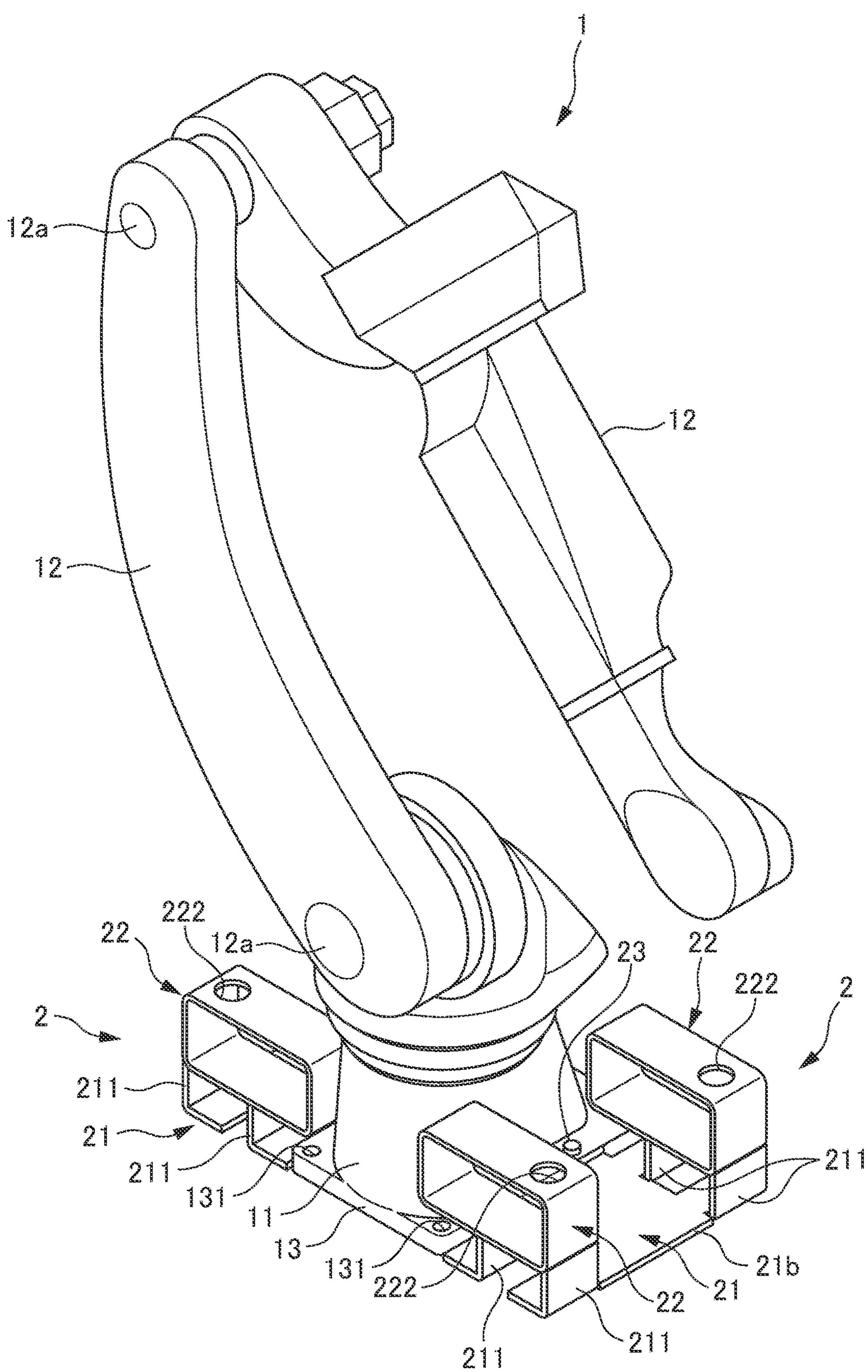
FIG. 1 is a perspective view of an article to be transported (an articulated robot) having attached thereto a securing aid according to an embodiment of the present disclosure.
Figure 2:
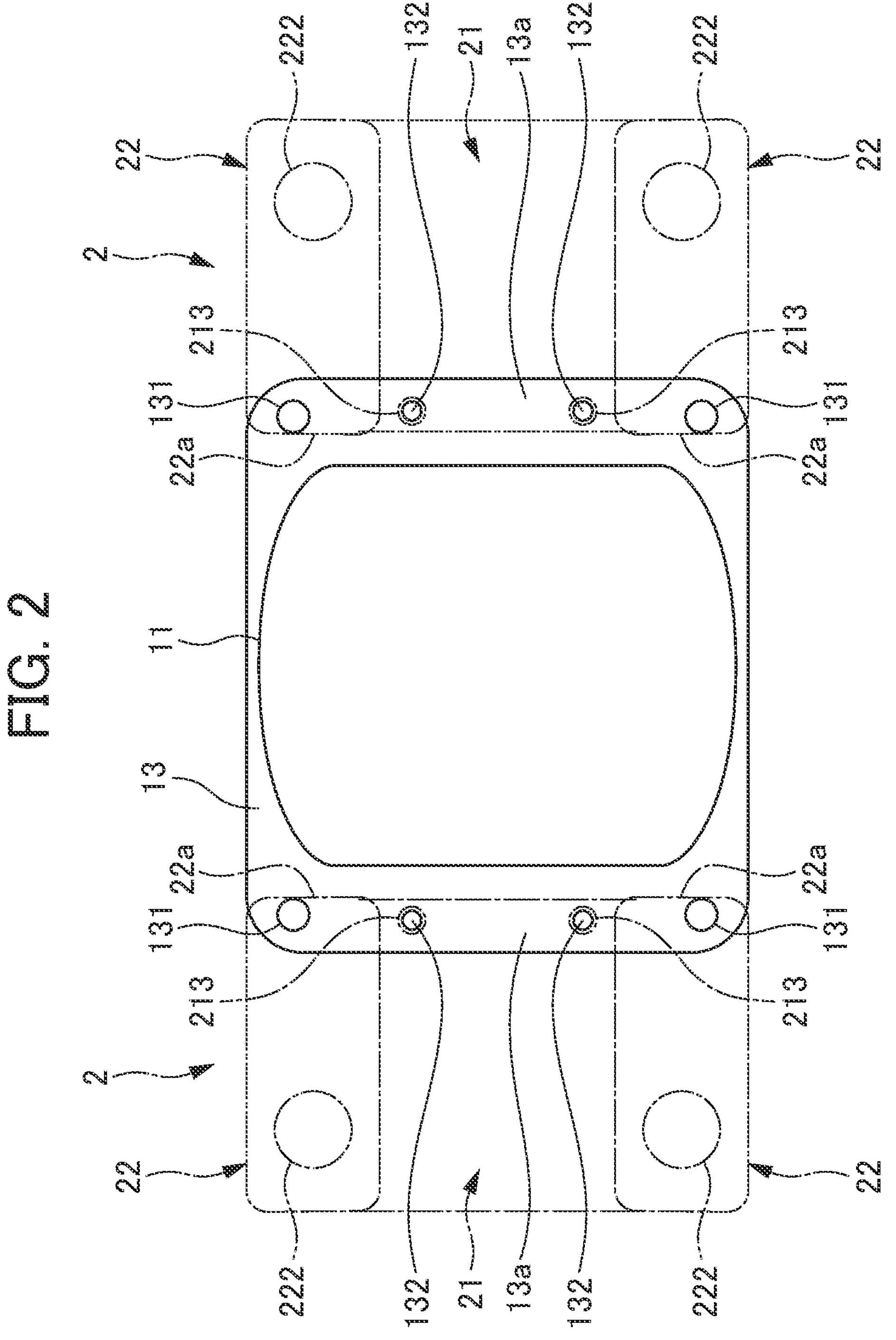
FIG. 2 is a planar view showing a securing base for the article to be transported.

FIG. 1 shows a robot 1 in a posture for being transported by a transporting means. The robot 1 includes a securing base 11 and a plurality of arms 12 that are provided over the securing base 11 so as to be able to swing around a plurality of joints 12*a*. As shown in FIG. 2, the securing base 11 has a flange part 13 at a lower end part thereof. The flange part 13 is formed to have a substantially rectangular shape in a planar view and is provided so as to jut out toward the surroundings from the lower end part of the securing base 11. The flange part 13 has, in the four corners thereof, installation bolt holes 131 as though-holes for insertion of bolts for securing the robot 1 onto an installation surface. In the robot 1 according to the present embodiment, the installation bolt holes 131 constitute a second fastening structure of the robot 1.

To the flange part 13 of the securing base 11 of the robot 1, two securing aids 2, 2 are attached, with the securing base 11 being interposed therebetween. As shown in FIG. 2, the flange part 13 of the securing base 11 includes two opposing lateral parts 13*a*, 13*a*, each of which has two bolt holes 132 as through-holes positioned between the installation bolt holes 131, 131 in the four corners. The pair of bolt holes 132, 132 aligned with each other constitute a third fastening structure for fastening the securing aids 2 (to be described later). In FIG. 2, the two securing aids 2, 2, are indicated with imaginary lines.

Figure 3:
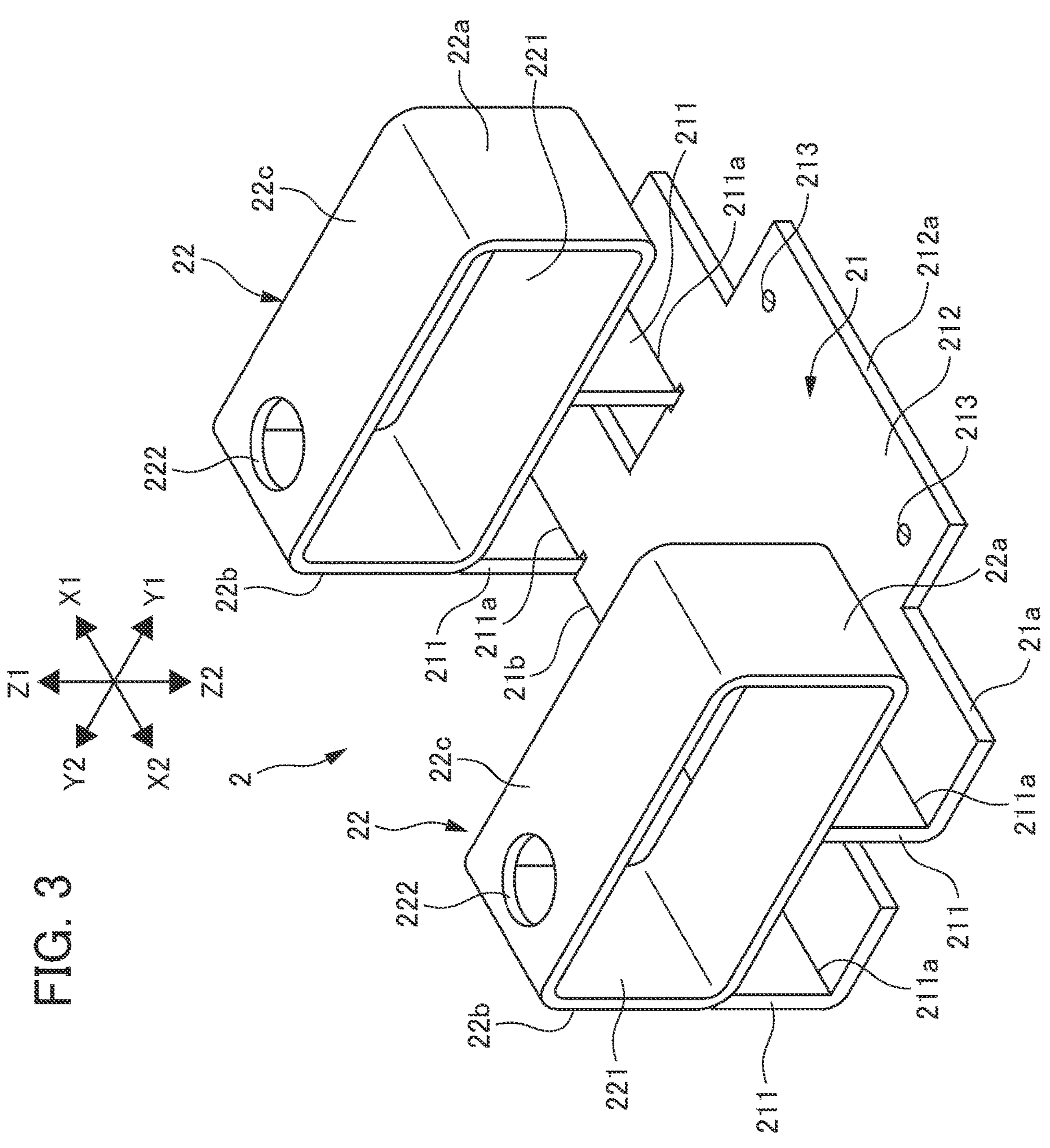
FIG. 3 is a perspective view of the securing aid according to the present embodiment.
Figure 4:
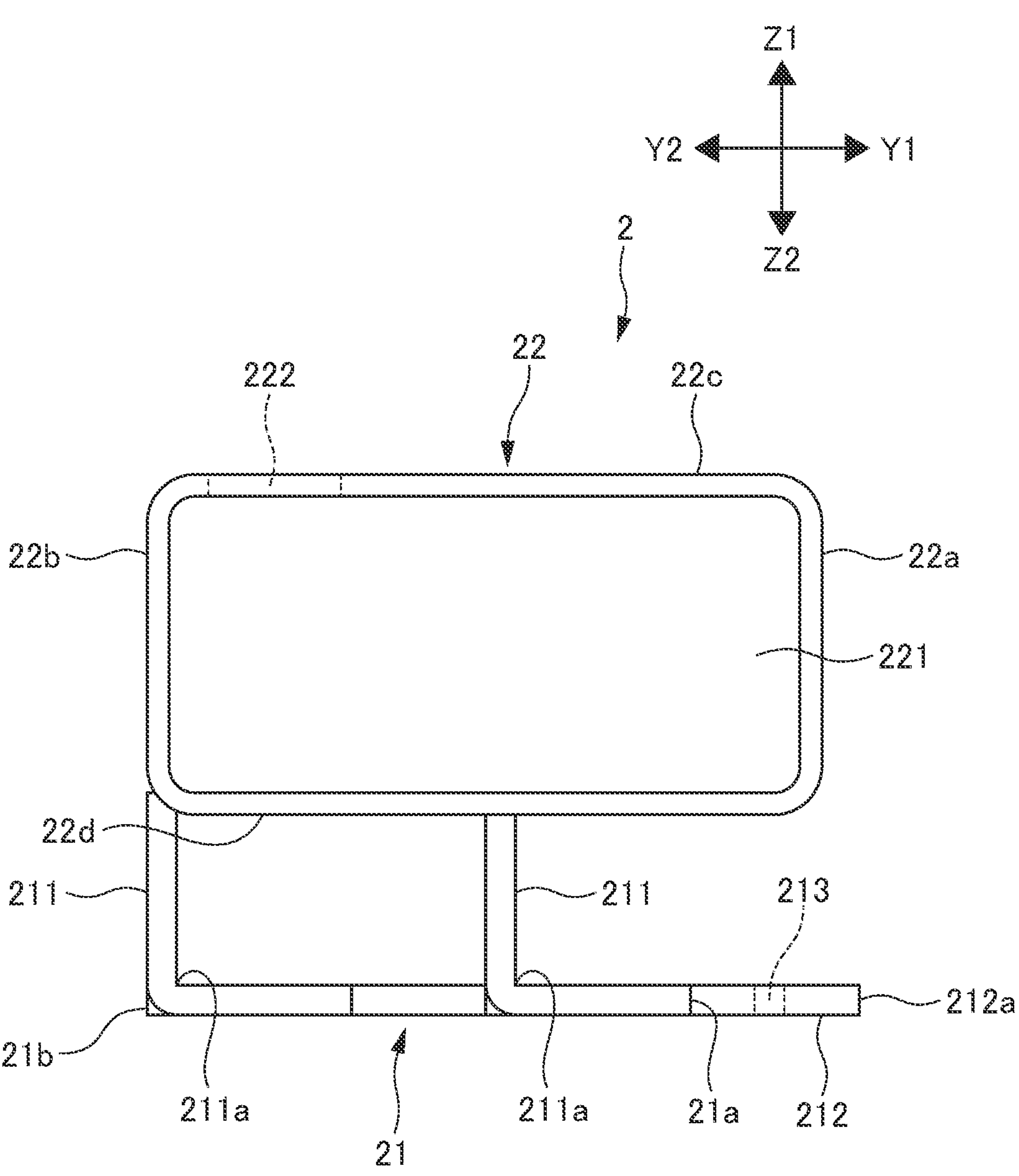
FIG. 4 is a side view of the securing aid according to the present embodiment.

A specific structure of the securing aid 2 is shown in FIGS. 3 and 4. Among the directions indicated by the arrows in FIGS. 3 and 4, the X1-X2 direction denotes the width direction of the securing aid 2. The Y1-Y2 direction denotes the front-back direction of the securing aid 2. In the present specification, the Y1 direction is toward the front of the securing aid 2, whereas the opposite Y2 direction is toward the rear of the securing aid 2. The Z1-Z2 direction denotes the height direction of the securing aid 2. The Z1 direction is toward the top of the securing aid 2, whereas the opposite Z2 direction is toward the bottom of the securing aid 2. The securing aid 2 includes a base plate 21 and a pair of pressed parts 22, 22.

The base plate 21 is formed of a flat metal plate. The width of the base plate 21 is substantially equal to the width of the flange part 13 of the securing base 11 of the robot 1. The base plate 21 has, in the two end parts thereof in the width direction, upright leg parts 211 standing at the substantially right angle and extending upwards. In each of the end parts of the base plate 21 in the width direction, the two upright leg parts 211 are provided in parallel to each other while being arranged in the front-back direction of the base plate 21. Accordingly, the base plate 21 has four upright leg parts 211. The upright leg parts 211 have surfaces along the width direction of the base plate 21. The width of each of the upright leg parts 211 is substantially equal to the width of each of the pressed parts 22. The heights of the four upright leg parts 211 from the base plate 21 are substantially equal to one another.

The upright leg parts 211 in the present embodiment are formed by bending portions of the base plate 21 corresponding to the two end parts thereof in the width direction, at the substantially right angle in mutually the same direction, along bending lines 211*a* each extending along the width direction of the base plate 21. Alternatively, the upright leg parts 211 may be formed separately from the base plate 21, so as to be secured on the top face of the base plate 21 by welding, bolts, rivets, or the like.

A front end part 21*a* of the base plate 21 is provided with a rectangular securing piece 212 that is integrally formed. The securing piece 212 is constituted by a portion, of the front end part 21*a*, which is between the upright leg parts 211, 211 provided in the two end parts of the base plate 21 in the width direction, juts out toward the front, and is flush with the base plate 21.

The securing piece 212 is a portion that is fastened with bolts onto the securing base 11 of the robot 1. The securing piece 212 has two bolt holes 213, 213 as through-holes arranged in the width direction. As shown in FIG. 2, the two bolt holes 213, 213 are positioned so as to correspond to the positions of the two bolt holes 132, 132 provided aligned with each other in the flange part 13 of the securing base 11 of the robot 1. In the securing aids 2 of the present embodiment, the bolt holes 213, 213 constitute a first fastening structure of the securing aids 2.

The pressed parts 22 are portions pressed by a lashing member 3 (to be described later), when the lashing member 3 is spanned across therebetween. Each of the pressed parts 22 is made of a metal plate and has a horizontally-elongated rectangular tubular shape. The horizontally-elongated rectangular space formed inside each of the pressed parts 22 constitutes an insertion hole 221 into which a fork (not shown) of a forklift (not shown) can be inserted at the time of conveyance of the robot 1 with the forklift. The width of each of the pressed parts 22 along the extension direction (the X1-X2 direction in FIG. 3) of the insertion hole 221 is substantially equal to the width of each of the upright leg parts 211.

The two pressed parts 22, 22 provided to each securing aid 2 are disposed in such a manner that the respective insertion holes 221, 221 are in alignment with each other on a straight line and are fixed onto the upright leg parts 211 by welding the bottom faces 22*d*, 22*d* of the pressed parts 22, 22 to the upper end parts of a corresponding one of the pairs of two upright leg parts 211 of the base plate 21. Alternatively, the pressed parts 22 may be fixed onto the upper end parts of the upright leg parts 211 with bolts, rivets, or the like.

As shown in FIG. 4, a front face 22*a* of each of the pressed parts 22 juts out up to the vicinity of the position of an end part 212*a* of the securing piece 212, while extending beyond the front end part 21*a* of the base plate 21. A rear face 22*b* of each of the pressed parts 22 substantially coincides in position with a rear end part 21*b* of the base plate 21.

In a top face 22*c* of each of the pressed parts 22, a hook hole 222 is provided in which a pull-up fixture (not shown) such as a hook can be hooked, at the time of pulling up the robot 1 by using a pull-up device (not shown).

Figure 5:
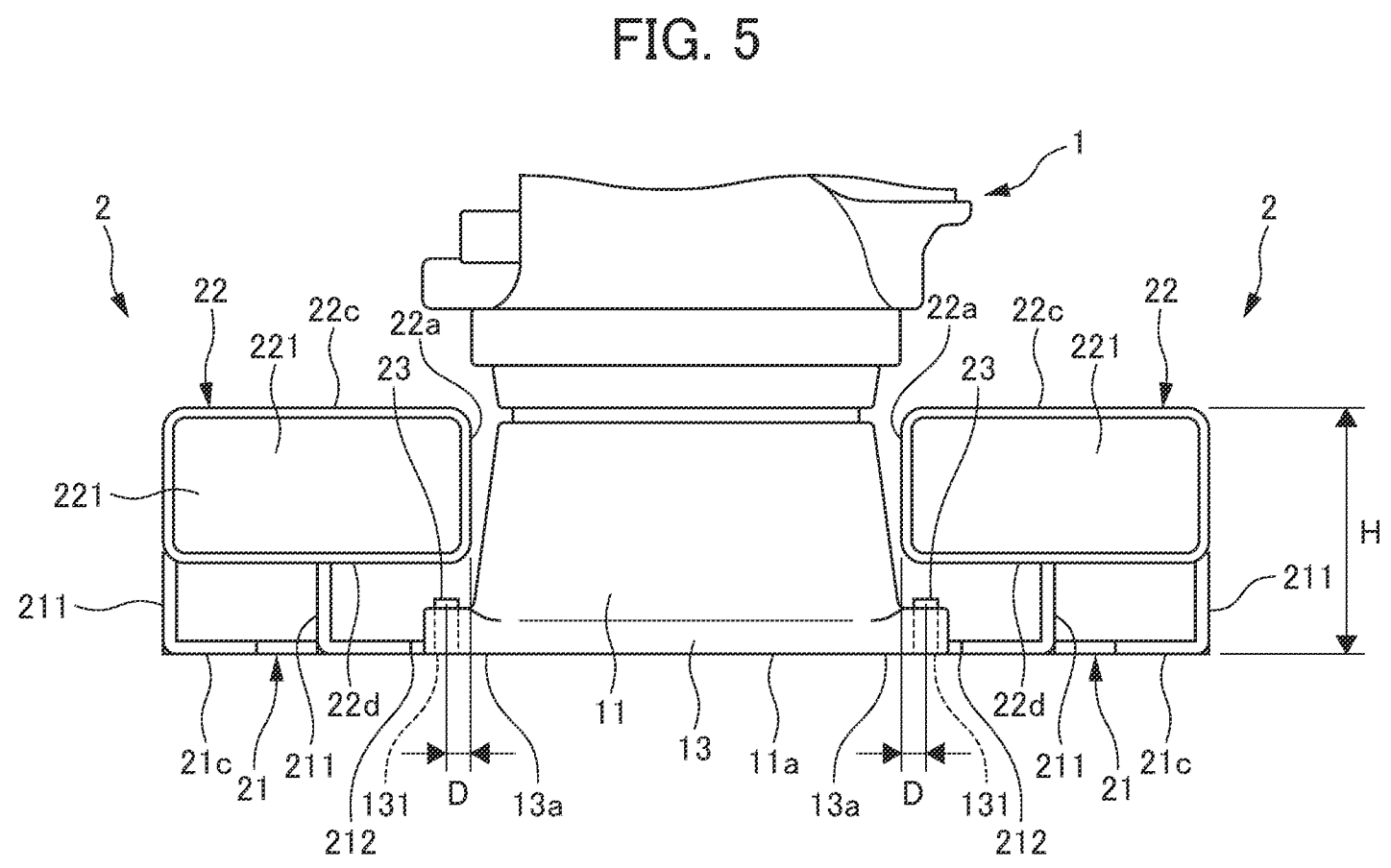
Figure 6:
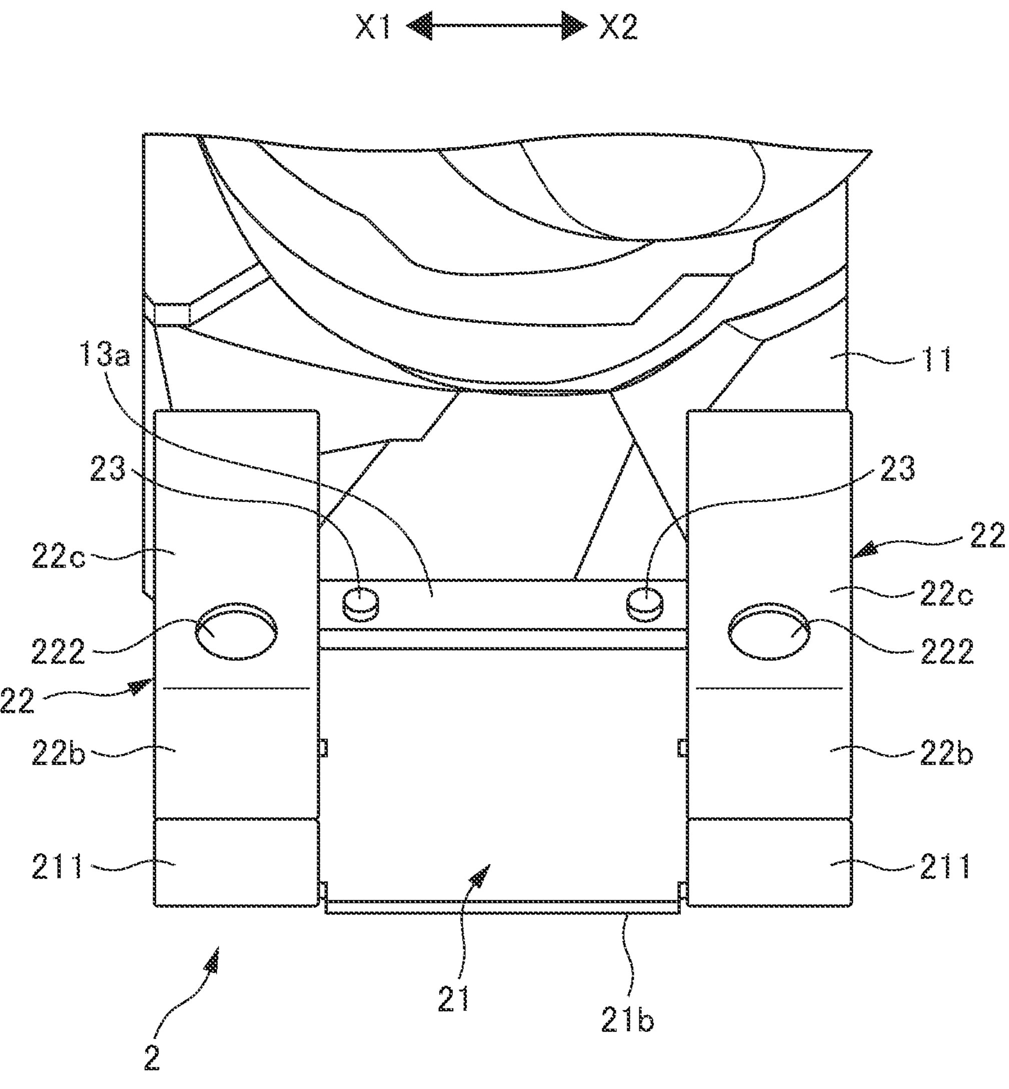
FIG. 6 is an enlarged perspective view showing, from diagonally above, an attachment portion of the securing aid and the securing base for the article to be transported according to the present embodiment.

As shown in FIG. 1, FIG. 5, and FIG. 6, each of the securing aids 2 is fastened and secured onto the lateral part 13*a* of the flange part 13 of the securing base 11 of the robot 1, by using attachment bolts 23, 23. More specifically, the securing piece 212 of the base plate 21 of the securing aid 2 is positioned with respect to the securing base 11 of the robot 1. In this situation, the two bolt holes 213, 213 provided in the securing piece 212 match the two bolt holes 132, 132 provided in the flange part 13 of the securing base 11. Subsequently, the attachment bolts 23, 23, are inserted through both of the bolt holes 213, 213 and 132, 132, so that the attachment bolts 23, 23 realizes the fastening, while both of the bolt holes 213, 213 and 132, 132 work in collaboration. As a result, the securing aid 2 is secured to the flange part 13 of the securing base 11.

As shown in FIG. 1 and FIG. 5, to the securing base 11 of the robot 1, the two securing aids 2, 2 are secured with the securing base 11 being interposed therebetween. In the state where the securing aids 2, 2 are secured to the securing base 11, the bottom face 11*a* of the securing base 11 is arranged so as to be substantially flush with the bottom faces 21*c*, 21*c* of the base plates 21, 21 of the securing aids 2, 2. Accordingly, the ground contact area of the robot 1 is kept large, and stability at the time of transport is thus improved.

The entirety of each of the pressed parts 22 attached to the upright leg parts 211 is disposed in positions higher than the positions of the installation bolt holes 131 formed in the securing base 11 of the robot 1. As shown in FIG. 5, the bottom faces 22*d* of the pressed parts 22 are disposed in positions higher than the installation bolt holes 131 formed in the securing base 11. The height H of each of the securing aids 2 is a height obtained by adding the height of the upright leg part 211 provided on the base plate 21 to the height of the pressed part 22.

As shown in FIG. 2 and FIG. 5, the front face 22*a* of each of the pressed parts 22 of the securing aids 2 secured onto the securing base 11 is positioned above the flange part 13 and is positioned close to the securing base 11. The pressed parts 22 are disposed in correspondence with the four corners of the flange part 13 of the securing base 11. At least a part of the installation bolt holes 131 in the flange part 13 is disposed underneath the pressed parts 22 of the securing aids 2. The bottom faces 22*d* of the pressed parts 22 are positioned higher than the installation bolt holes 131 formed in the securing base 11. Accordingly, as shown in FIG. 5, the front face 22*a* of each of the pressed parts 22 of the securing aids 2 is positioned closer to the securing base 11 by a distance D than the position of the installation bolt hole 131 in the flange part 13 of the securing base 11. Consequently, even when the two securing aids 2, 2, are attached to the robot 1 with the securing base 11 being interposed therebetween, it is possible to avoid the situation where the two securing aids 2, 2 excessively jut out laterally.

As shown in FIG. 2, the two bolt holes 213, 213 formed in the securing piece 212 of each of the securing aids 2 and the two bolt holes 132, 132 formed in the securing base 11 of the robot 1 are arranged between the two pressed parts 22, 22 of the securing aid 2 and are not disposed underneath the pressed parts 22, 22. As shown in FIG. 6, the attachment bolts 23, 23 for fastening each of the securing aids 2 onto the securing base 11 are exposed between the two pressed parts 22, 22 of the securing aid 2. Accordingly, the attachment bolts 23, 23 can easily be accessed, which makes it easy to perform the tasks of attaching and removing the securing aids 2.

Figure 7:
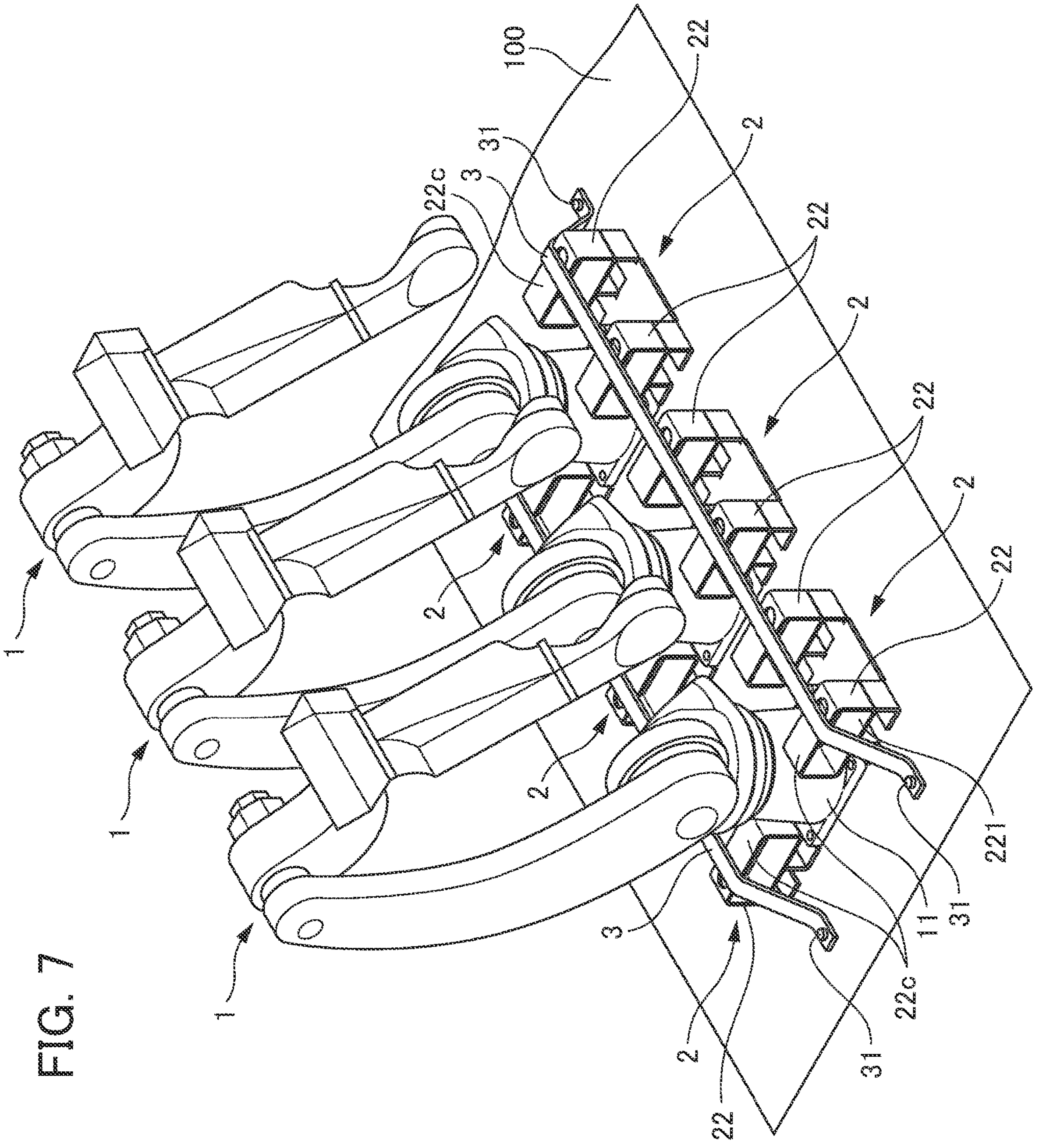
FIG. 7 is a perspective view of a securing structure for the article to be transported according to the present embodiment.

FIG. 7 shows a securing structure for a plurality of robots 1 secured to a securing surface 100. The securing surface 100 is a placement surface of a transporting means on which the robots 1 are installed when being transported. The securing surface 100 may be a loading platform of a truck, for example. Two securing aids 2, 2 are attached to each of the plurality of robots 1. While the respective securing aids 2 for the robots 1 are oriented in mutually the same direction, the plurality of robots 1 are arranged at regular intervals on the securing surface 100, in such a manner that the pressed parts 22, 22 of the securing aids 2, 2 for the robots 1, 1 positioned adjacent to one another are aligned on a straight line.

With the plurality of robots 1 being placed on the securing surface 100, lashing members 3 are spanned across the pressed parts 22 of the securing aids 2 for the robots 1 arranged on the straight lines, so as to press the securing aids 2 against the securing surface 100. The pressed parts 22 arranged on the straight lines are lined up in two rows, with the securing bases 11 of the robots 1 being interposed therebetween. Accordingly, each of the lashing members 3, 3 is spanned across a different one of the two rows of pressed parts 22. Each of the lashing members 3, 3, is secured onto the securing surface 100 by a securing member 31, with predetermined tension being applied thereto so as to press the pressed parts 22 against the securing surface 100.

Figure 8:
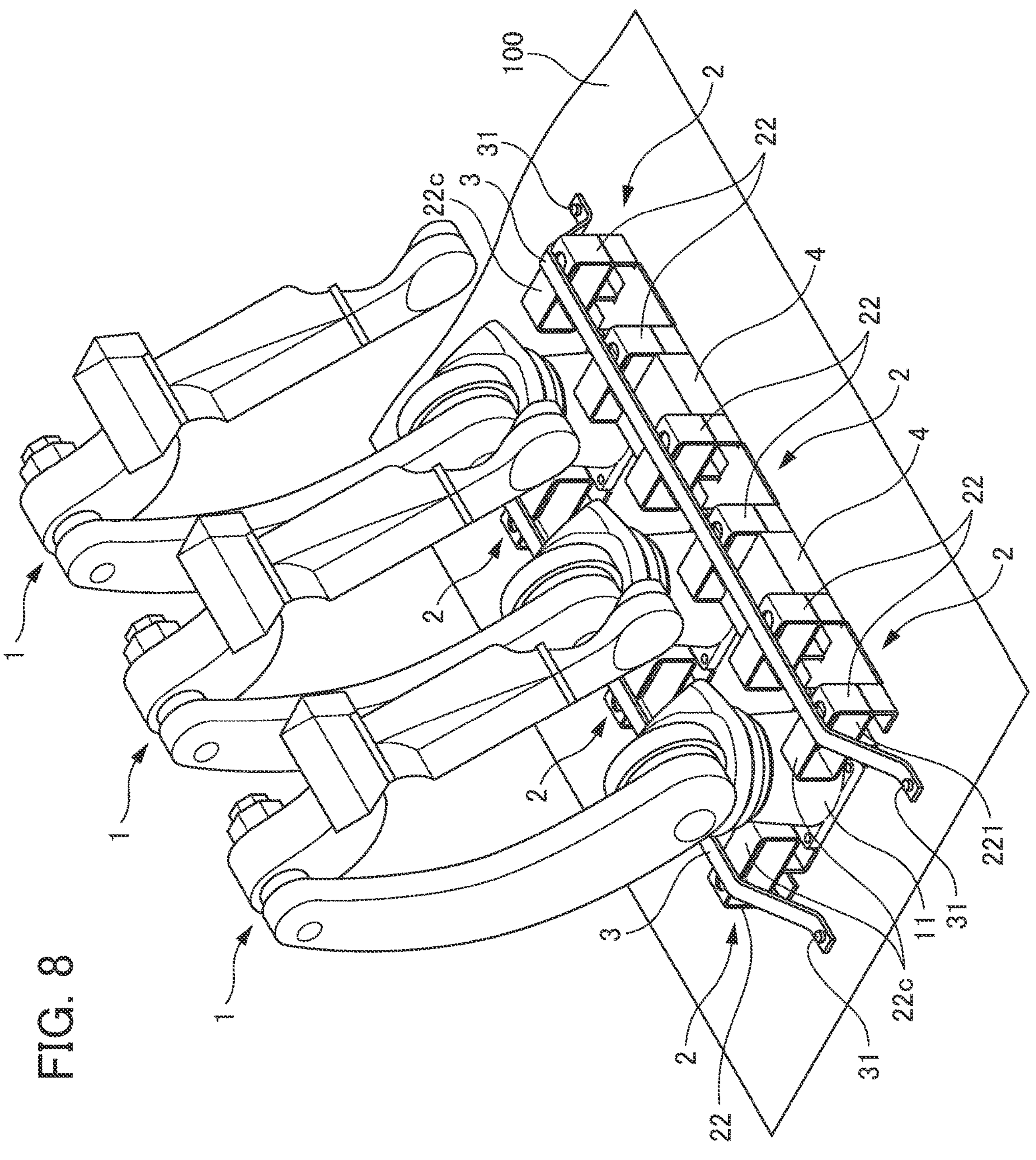
FIG. 8 is a perspective view showing another example of the securing structure for the article to be transported according to the present embodiment.

The lashing members 3 shown in FIG. 8 are constituted with belts. However, the lashing members 3 do not necessarily have to be belts and may be chains, ropes, wires, or the like. As the securing members 31, it is possible to use bolts, hooks, buckles, or the like as appropriate, in accordance with the type of the lashing members 3.

By using the securing structure described above, it is possible to collectively secure the plurality of robots 1 onto the securing surface 100, by simply causing the lashing members 3 to be spanned across the pressed parts 22 of the plurality of robots 1, so that the pressed parts 22 are pressed against the securing surface 100, while the two securing aids 2, 2 are attached to each of the plurality of robots 1. There is no need to attach a dedicated fixture to the securing surface 100 in advance for the purpose of securing the robots 1. There is no need to fasten each of the robots 1 onto the securing surface 100 with bolts, either. Because the securing task to be performed on the plurality of robots 1 is simplified in this manner, it is possible to secure the plurality of robots 1 onto the securing surface 100 easily and in a brief time. When the robots 1 are to be unloaded from the securing surface 100, it is possible to easily cancel the secured state of the plurality of robots 1 by simply removing the lashing members 3, 3.

Because the top faces 22*c* of the pressed parts 22 of the securing aids 2 are disposed in the positions sufficiently higher than the securing surface 100, it is possible to keep the tension of the lashing members 3 high. It is therefore possible to stably secure the robots 1. In addition, because the positions in which the lashing members 3 are spanned across are high, it is possible to press the robots 1 against the securing surface 100 in the positions closer to the centers of gravity of the robots 1. Accordingly, the advantageous effect of preventing swaying is also improved.

Each of the securing aids 2 for the robots 1 includes the pair of pressed parts 22, 22 which interpose therebetween the two bolt holes 213, 213 to be fastened onto the securing base 11. Because each of the robots 1 is pressed against the securing surface 100, as a result of having the lashing member 3 spanned across each pair of pressed parts 22, 22, it is possible to prevent the robots 1 from wobbling.

The two securing aids 2, 2 are attached, respectively, to the two opposing lateral parts 13*a*, 13*a* of the flange part 13 of the securing base 11. Accordingly, on both sides of the securing base 11, each of the robots 1 is pressed against the securing surface 100 by the lashing members 3, 3. Consequently, each of the robots 1 is stably pressed against and secured onto the securing surface 100, by the two lashing members 3, 3, arranged on both sides.

Each of the pressed parts 22 of the securing aids 2 has the insertion hole 221 in which the fork of a forklift can be inserted. Consequently, an operator is able to easily perform, with the use of the forklift, the task of loading the robots 1 onto the securing surface 100 and the task of unloading the robots 1 from the securing surface 100. Because the top face 22*c* of each of the pressed parts 22 has the hook hole 222 for a pull-up fixture, an operator is able to easily perform, with the use of a pull-up device, task of loading the robots 1 onto the securing surface 100 and the task of unloading the robots 1 from the securing surface 100.

In order to make it further unlikely for the plurality of robots 1 to sway while being secured to the securing surface 100 with the lashing members 3, a spacer 4 may be inserted between the securing aids 2, 2 of the robots 1, 1 positioned adjacent to each other, as shown in FIG. 8. In FIG. 8, the block-shaped spacers 4, 4 are each arranged between the pressed parts 22, 22 of the securing aids 2, 2, of the robots 1, 1, positioned adjacent to one another. The spacers 4 maintain the robots 1, 1 spaced apart from one another at regular intervals, thereby making it further unlikely for the robots 1 to sway at the time of transport. When the securing surface 100 is a loading platform of a truck, the spacers may be arranged between the securing aids 2 and wall surfaces (hinged panels) enclosing the securing surface 100.

Figure 9:
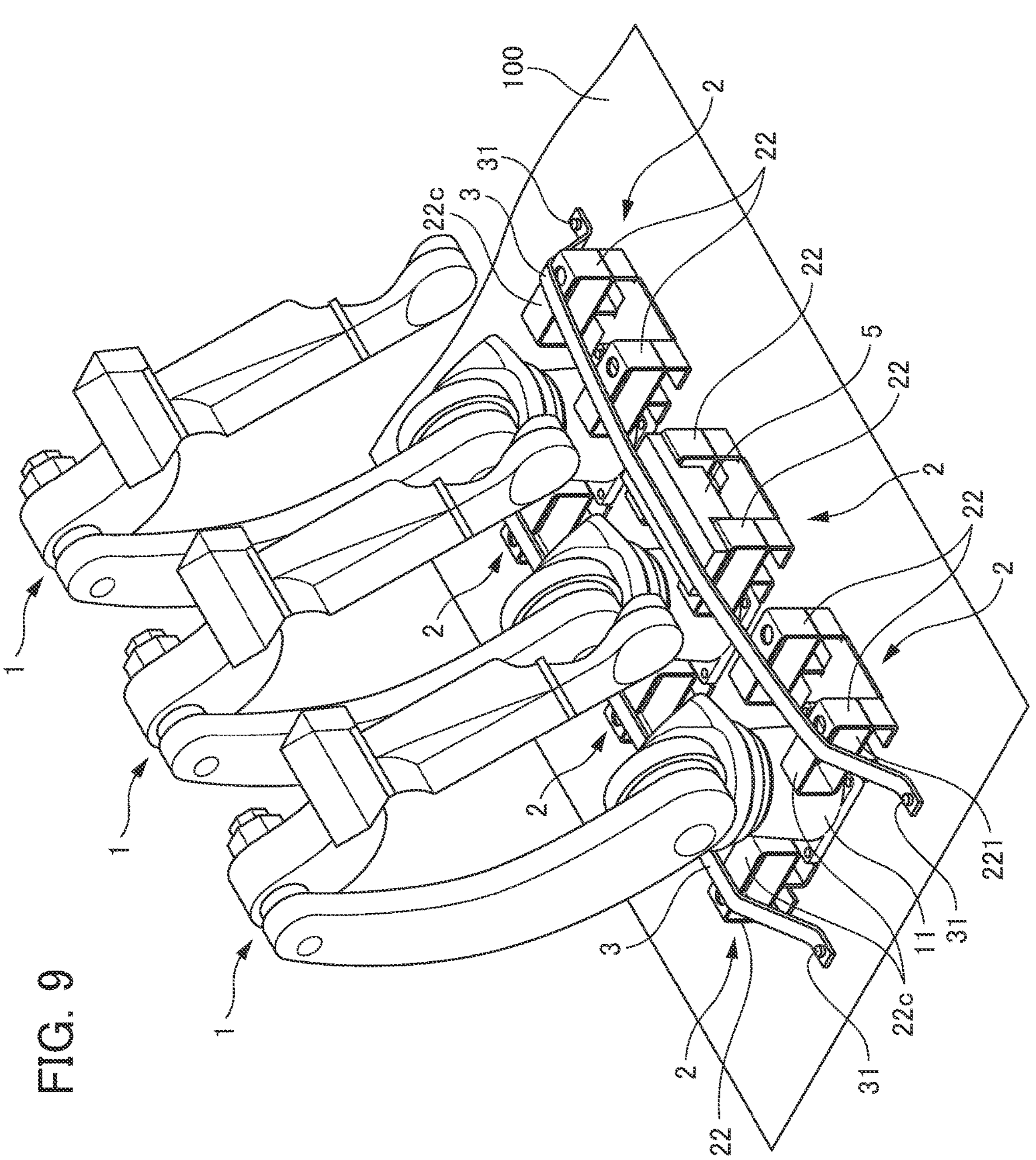
FIG. 9 is a perspective view showing yet another example of the securing structure for the article to be transported according to the present embodiment.

In order to increase the tension of the lashing members 3 and to bring the plurality of robots 1 into a further firmly secured state, a batten 5 may be placed on any of the pressed parts 22 of the securing aid 2, as shown in FIG. 9. The batten 5 shown in FIG. 9 is placed across the two pressed parts 22, 22 of the securing aid 2 for the robot 1 positioned at the center in terms of the array direction of the robots 1. As a result of being spanned across the top face of the batten 5, the highest tension is applied to the lashing member 3 in a substantially central part of the lashing member 3 in the lengthwise direction. For this reason, the force pressing the robots 1 against the securing surface 100 via the securing aids 2 is further strengthened, thereby making it possible to achieve a further firmly secured state. The securing structure shown in FIG. 9 may be additionally provided with the spacers 4 shown in FIG. 8, in addition to the batten 5.

Figure 10:
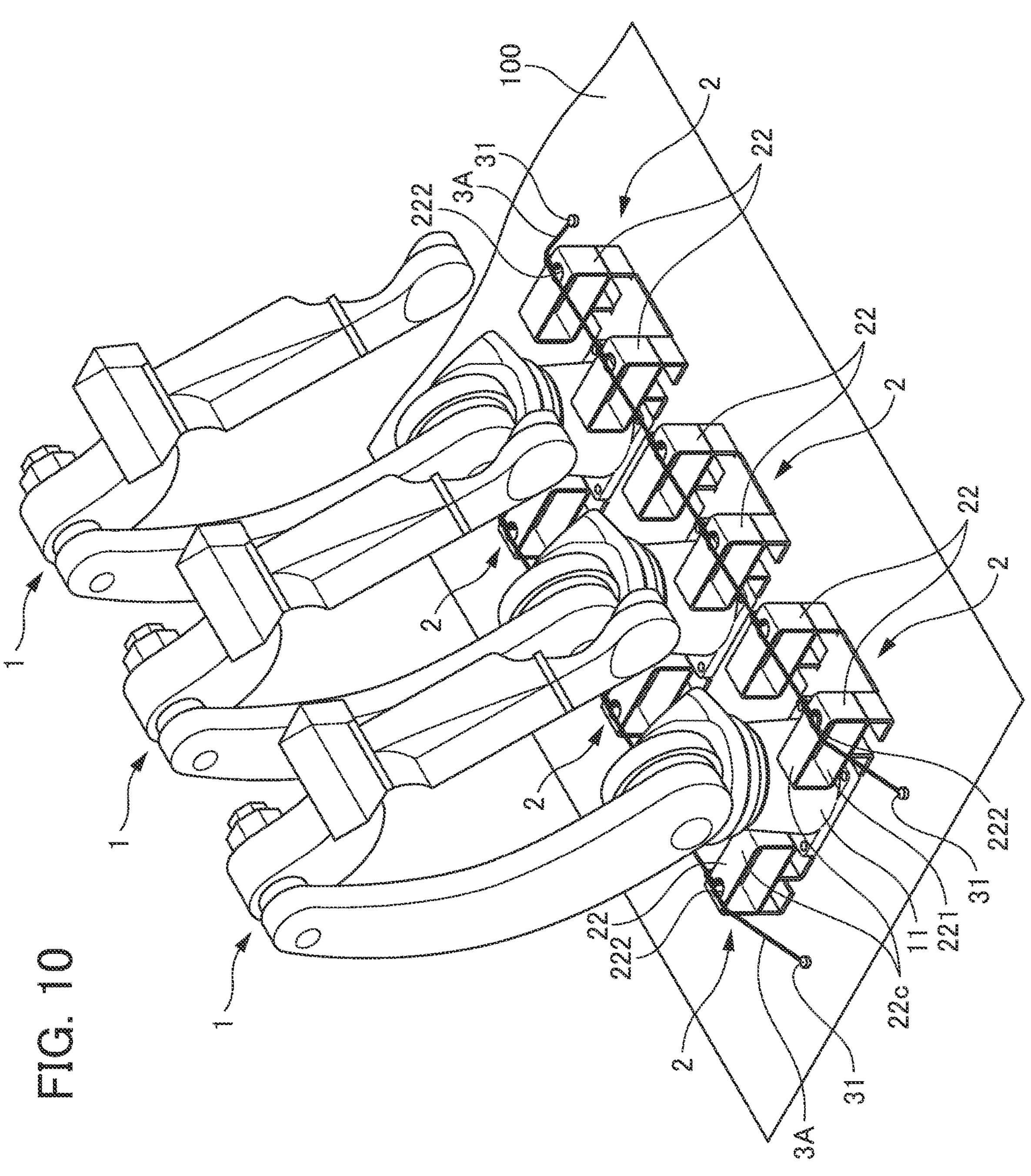
FIG. 10 is a perspective view showing yet another example of the securing structure for the article to be transported according to the present embodiment.

FIG. 10 shows an example using lashing members 3A constituted by ropes. Each of the lashing members 3A is tied across the pressed parts 22, while being wound by one or more turns through each of the hook holes 222 of the pressed parts 22 aligned with each other on straight lines. As a result, since the lashing members 3A are securely bound to each of the robots 1, the force pressing and securing the plurality of robots 1 against and onto the securing surface 100 is further strengthen. The securing structure shown in FIG. 10 may be additionally provided with the spacers 4 shown in FIG. 8.

EXPLANATION OF REFERENCE NUMERALS

1: Robot (article to be transported)
13*a*: Lateral part
131: Installation bolt hole (second fastening structure)
132: Bolt hole (third fastening structure)
2: Securing aid
22: Pressed part
213: Bolt hole (first fastening structure)
221: Insertion hole
222: Hook hole
3, 3A: Lashing member
100: Securing surface

The invention claimed is:

1. A securing aid for aiding securing an article to be transported to a securing surface of a transporting means that transports the article, the securing aid comprising:
- a base plate having a first fastening structure configured to be fastened to the article to be transported; and
- a pair of pressed parts respectively disposed on two end portions of the base plate and configured to be pressed by a lashing member in a state of being pressed against the securing surface by the lashing member, wherein
- the two end portions on which the pair of pressed parts are disposed are opposite to each other in a width direction of the base plate,
- a second fastening structure configured to fasten the article to be transported to an installation surface is provided in the lower portion of the article to be transported, and in a planar view, at least a part of the second fastening structure of the article to be transported is disposed underneath the pair of pressed parts of the securing aid,
- an entirety of the pair of pressed parts is disposed at a position higher than the second fastening structure of the article to be transported,
- the base plate has a securing piece between the pair of pressed parts, the securing piece jutting out in a direction orthogonal to a direction in which the pair of pressed parts are arranged, and
- the first fastening structure is provided in the securing piece and is configured to be fastened to the article to be transported by cooperating with a third fastening structure provided in a lower portion of the article to be transported.

2. The securing aid according to claim 1, wherein
- in a planar view, the first fastening structure of the securing aid and the third fastening structure of the article to be transported are not disposed underneath the pair of pressed parts of the securing aid.

3. The securing aid according to claim 1, wherein
- the pair of pressed parts are arranged while the first fastening structure is interposed therebetween.

4. The securing aid according to claim 1, wherein
- the pair of pressed parts have an insertion hole in which a fork of a forklift can be inserted.

5. The securing aid according to claim 1, wherein
- the pair of pressed parts have a horizontally-elongated rectangular tubular shape and have a hook hole in which a pull-up fixture for pulling up the article to be transported can be hooked, the hook hole being formed in a top face of each of the pair of pressed parts.

6. A securing structure for securing an article to be transported to a securing surface of a transporting means that transports the article, the securing structure comprising:
- the securing aid according to claim 1, the securing aid being attachable to the article to be transported; and
- a lashing member that presses the securing aid against the securing surface, wherein
- the securing aid includes a base plate having a first fastening structure configured to be fastened to the article to be transported, and a pair of pressed parts respectively disposed on two end portions of the base plate and configured to be pressed by the lashing member, and
- in a state where the securing aid is on the securing surface and juts out in a lateral direction with respect to the article to be transported, and the first fastening structure of the securing aid is fastened to the article to be transported in cooperation with a third fastening structure provided in a lower portion of the article to be transported, the lashing member is spanned across the pair of pressed parts of the securing aid so as to press the securing aid against the securing surface.

7. The securing structure according to claim 6, wherein
- in a planar view of the securing aid, at least a part of a second fastening structure that is provided in the lower portion of the article to be transported and is configured to fasten the article to be transported to an installation surface is disposed underneath the pair of pressed parts of the securing aid.

8. The securing structure according to claim 6, wherein in a planar view of the securing aid, the first fastening structure of the securing aid and the third fastening structure of the article to be transported are not disposed underneath the pair of pressed parts of the securing aid.

9. The securing structure according to claim 6, wherein the pair of pressed parts of the securing aid are arranged while the first fastening structure is interposed therebetween.

10. The securing structure according to claim 6, wherein the third fastening structure of the article to be transported is provided in each of two opposing lateral parts of the article to be transported, and the securing aid is attached to each of the two lateral parts such that the article to be transported is interposed therebetween.

11. A securing aid for aiding securing an article to be transported to a securing surface of a transporting means that transports the article, the securing aid comprising:

a base plate having a first fastening structure configured to be fastened to the article to be transported; and a pair of pressed parts respectively disposed on two end portions of the base plate and configured to be pressed by a lashing member in a state of being pressed against the securing surface by the lashing member, wherein the two end portions on which the pair of pressed parts are disposed are opposite to each other in a width direction of the base plate, the pair of pressed parts have a horizontally-elongated rectangular tubular shape and have a hook hole in which a pull-up fixture for pulling up the article to be transported can be hooked, the hook hole being formed in a top face of each of the pair of pressed parts, the base plate has a securing piece between the pair of pressed parts, the securing piece jutting out in a direction orthogonal to a direction in which the pair of pressed parts are arranged, and the first fastening structure is provided in the securing piece and is configured to be fastened to the article to be transported by cooperating with a third fastening structure provided in a lower portion of the article to be transported.

12. The securing aid according to claim 11, wherein a second fastening structure configured to fasten the article to be transported to an installation surface is provided in the lower portion of the article to be transported, and in a planar view, at least a part of the second fastening structure of the article to be transported is disposed underneath the pair of pressed parts of the securing aid.

13. The securing aid according to claim 11, wherein in a planar view, the first fastening structure of the securing aid and the third fastening structure of the article to be transported are not disposed underneath the pair of pressed parts of the securing aid.

14. The securing aid according to claim 11, wherein the pair of pressed parts are arranged while the first fastening structure is interposed therebetween.

* * * * *